US010753420B2

(12) United States Patent
Prevot et al.

(10) Patent No.: US 10,753,420 B2
(45) Date of Patent: Aug. 25, 2020

(54) ROTATING THREE WAY VALVE FOR SWITCHABLE AIR SPRINGS

(71) Applicant: BEIJINGWEST INDUSTRIES CO., LTD., Beijing (CN)

(72) Inventors: Benoit Prevot, Rossy en (FR); Dominique Fanelli, Rossy en (FR); Jocelyn Marchand, Rossy en (FR)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 169 days.

(21) Appl. No.: 15/954,572

(22) Filed: Apr. 16, 2018

(65) Prior Publication Data
US 2019/0316651 A1    Oct. 17, 2019

(51) Int. Cl.
| F16F 9/50 | (2006.01) |
| F16F 9/04 | (2006.01) |
| F16F 9/32 | (2006.01) |
| F16F 9/34 | (2006.01) |

(52) U.S. Cl.
CPC ........... *F16F 9/50* (2013.01); *F16F 9/049* (2013.01); *F16F 9/325* (2013.01); *F16F 9/341* (2013.01); *F16F 2230/06* (2013.01); *F16F 2232/08* (2013.01)

(58) Field of Classification Search
CPC .... F16F 9/50; F16F 9/049; F16F 9/341; F16F 9/325; F16F 2232/08; F16F 2230/06
See application file for complete search history.

(56) References Cited

U.S. PATENT DOCUMENTS

| 3,780,622 A | * | 12/1973 | Vogel .................. F03C 1/14 |
| | | | 91/296 |
| 4,231,554 A | * | 11/1980 | Ekonen .............. B60G 17/0525 |
| | | | 137/625.68 |
| 4,634,143 A | | 1/1987 | Asami et al. |
| | | | (Continued) |

FOREIGN PATENT DOCUMENTS

| CN | 107709721 A | 2/2018 |
| DE | 19518560 A1 | 11/1995 |

OTHER PUBLICATIONS

Extended European Search Report dated Oct. 16, 2019 for counterpart European patent application No. EP19167813.5.
(Continued)

Primary Examiner — Vishal R Sahni
(74) Attorney, Agent, or Firm — William H. Honaker; Dickinson Wright PLLC (57) ABSTRACT

A valve assembly for an air spring includes a body having an opened end disposed in communication with a first tank and a closed end. The body defines a cavity separated by a divider into an upper and a lower portion. The body defines at least one upper orifice in communication with the cavity and a second tank; and at least one lower orifice in communication with the cavity and a third tank. An actuator is disposed in communication with the first, the second, and the third tank. The actuator is rotatable from a first position wherein the actuator is in communication with the first tank alone to a second position allowing communication between the first and the second tank, a third position allowing communication between the first and the third tank, and a fourth position allowing communication between the first, the second, and the third tank.

17 Claims, 5 Drawing Sheets

(56) References Cited

U.S. PATENT DOCUMENTS

| | | |
|---|---|---|
| 4,635,906 A | 1/1987 | Buma |
| 4,647,068 A | 3/1987 | Asami et al. |
| 4,667,978 A | 5/1987 | Asami et al. |
| 4,671,533 A | 6/1987 | Asami et al. |
| 4,671,534 A | 6/1987 | Yano |
| 4,690,429 A | 9/1987 | Asami et al. |
| 4,693,494 A | 9/1987 | Buma et al. |
| 4,714,271 A | 12/1987 | Buma et al. |
| 4,714,272 A | 12/1987 | Buma et al. |
| 4,717,172 A | 1/1988 | Asami et al. |
| 4,722,546 A | 2/1988 | Asami et al. |
| 4,725,072 A | 2/1988 | Asami et al. |
| 4,726,604 A | 3/1988 | Asami et al. |
| 4,728,120 A | 3/1988 | Buma et al. |
| 4,729,580 A | 3/1988 | Buma et al. |
| 4,743,000 A | 5/1988 | Kamopp |
| 4,744,589 A | 5/1988 | Buma et al. |
| 4,789,935 A | 12/1988 | Buma et al. |
| RE33,601 E | 6/1991 | Asami et al. |
| RE33,626 E | 7/1991 | Asami et al. |
| 5,649,692 A * | 7/1997 | Gilsdorf ............. B60G 11/26 267/64.21 |
| 9,211,776 B2 | 12/2015 | May |
| 2001/0008333 A1* | 7/2001 | McKenzie ........ B60G 17/0525 280/124.157 |
| 2003/0038412 A1* | 2/2003 | Plath ............... B60G 17/0525 267/64.16 |
| 2011/0017555 A1* | 1/2011 | Battlogg ............... F16F 9/46 188/267.2 |
| 2013/0075998 A1* | 3/2013 | McAndrews ......... B62K 25/08 280/276 |
| 2016/0185179 A1 | 6/2016 | May |
| 2019/0211813 A1* | 7/2019 | Yanagibayashi ........ F04B 13/02 |

OTHER PUBLICATIONS

Second Office Action and search report dated Apr. 26, 2020 for counterpart Chinese patent application No. 201910269402.4, along with machine EN translation downloaded from EPO.

* cited by examiner

ROTATING THREE WAY VALVE FOR SWITCHABLE AIR SPRINGS

BACKGROUND OF THE INVENTION

1. Field of the Invention

The present invention generally relates to a valve assembly and, more particularly, a valve assembly for an air spring.

2. Description of the Prior Art

Air spring assemblies are used extensively in a wide range of industrial applications, but are mainly in transportation applications. Such "transportation applications" include, but are not limited to, use in passenger cars, vans, light trucks, commercial trucks, military vehicles, railroad locomotives and vehicles, military and commercial aircraft (airplanes), off-road or off-highway vehicles, farming equipment, construction equipment, mining equipment and vehicles, and other power-driven systems.

The air spring assembly can include additional switchable valves for changing the stiffness of the air spring assembly by switching on or off fluid communication with additional air reservoirs. One such a valve assembly is disclosed in U.S. Pat. No. 9,211,776 which discloses a valve assembly including a body disposed on a body axis extending between an opened end disposed in fluid communication with a first tank and a closed end and defining a cavity extending therebetween. A divider is disposed in the cavity separating the cavity into an upper portion between the opened end and the divider and a lower portion between the closed end and the divider. The body defines at least two orifices including at least one upper orifice and at least one lower orifice axially spaced from the at least one upper orifice.

SUMMARY OF THE INVENTION

The present invention in its broadest aspect provides a valve assembly that can be switched on or off to provide up to four different spring rates pending the switching condition. The present invention also provides improved packaging cost and controlled command for the valve and the air spring assembly. The present invention further provides a valve assembly with a reduced noise level for regulating air flow in the air spring assembly.

The valve assembly for the air spring includes a body disposed on a body axis extending between an opened end and a closed end. The opened end is disposed in fluid communication with a first tank. The body defines a cavity extending between the opened end and the closed end. A divider is disposed in the cavity separating the cavity into an upper portion and a lower portion. The upper portion extends between the opened end and the divider. The lower portion extends between the closed end and the divider. The body defines at least two orifices including at least one upper orifice and at least one lower orifice. The at least one upper orifice is disposed in fluid communication with the cavity and a second tank. The at least one lower orifice, axially spaced from the at least one upper orifice, is disposed in fluid communication with the cavity and a third tank. An actuator is disposed in the cavity of the body and rotatable along the body axis. The actuator is in fluid communication with the first tank, the second tank, and the third tank. The actuator is movable from a first position with the actuator being in fluid communication with the first tank alone to a second position allowing fluid communication between the first tank and the second tank, a third position allowing fluid communication between the first tank and the third tank, and a fourth position allowing fluid communication between the first tank, the second tank, and the third tank. The rotation movement of the actuator allows the stiffness rates of the air spring to be easily adjusted by switching the valve. In addition, the rotational movement provides a smooth transition between the stiffness rates, e.g. from the first position to the second position, the third position, or the fourth position, thereby reducing the amount of noises generated by a rectilinear movement of the valve member.

It is another aspect of the present invention to provide a valve assembly for an air spring. The valve assembly includes a casing disposed on a body axis extending between a proximal end and a distal end and defining a compartment extending therebetween. A cap is disposed at the proximal end and defines a first tank disposed in fluid communication with the compartment. A partitioning member is slidably disposed in the compartment separating the compartment into a second tank and a third tank. The second tank extends between the proximal end and the partitioning member. The third tank extends between the partitioning member and the distal end. A valve including a body is disposed on the body axis extending between an opened end and a closed end. The opened end is disposed in fluid communication with a first tank. The body defines a cavity extending between the opened end and the closed end. A divider is disposed in the cavity separating the cavity into an upper portion and a lower portion. The upper portion extends between the opened end and the divider. The lower portion extends between the closed end and the divider. The body defines at least two orifices including at least one upper orifice and at least one lower orifice. The at least one upper orifice is disposed in fluid communication with the cavity and a second tank. The at least one lower orifice, axially spaced from the at least one upper orifice, is disposed in fluid communication with the cavity and a third tank. An actuator is disposed in the cavity of the body and rotatable along the body axis. The actuator is in fluid communication with the first tank, the second tank, and the third tank. The actuator is movable from a first position with the actuator being in fluid communication with the first tank alone to a second position allowing fluid communication between the first tank and the second tank, a third position allowing fluid communication between the first tank and the third tank, and a fourth position allowing fluid communication between the first tank, the second tank, and the third tank.

It is a further aspect of the present invention to provide an air spring assembly. The air spring assembly includes a housing defining a chamber disposed on a center axis. A piston is disposed in the chamber. A bellows extends between a primary end secured to the housing and a secondary end secured to the piston defining a pocket extending between the housing and the piston. A casing is disposed on a body axis, spaced from the center axis, extending between a proximal end and a distal end and defining a compartment extending therebetween. A cap is disposed at the proximal end and defines a first tank disposed in fluid communication with the compartment. A partitioning member is slidably disposed in the compartment separating the compartment into a second tank and a third tank. The second tank extends between the proximal end and the partitioning member. The third tank extends between the partitioning member and the distal end. A valve including a body is disposed on the body axis extending between an opened end and a closed end. The opened end is disposed in fluid communication with a first tank. The body defines a cavity extending between the opened end and the closed end. A divider is disposed in the cavity separating the cavity into an upper portion and a lower portion. The upper portion extends between the opened end and the divider. The lower portion extends between the closed end and the divider. The body defines at least two orifices including at least one upper orifice and at least one lower orifice. The at least one upper orifice is disposed in fluid communication with the cavity and a second tank. The at least one lower orifice, axially spaced from the at least one upper orifice, is disposed in fluid communication with the cavity and a third tank. An actuator is disposed in the cavity of the body and rotatable along the body axis. The actuator is in fluid communication with the first tank, the second tank, and the third tank. The actuator is movable from a first position with the actuator being in fluid communication with the first tank alone to a second position allowing fluid communication between the first tank and the second tank, a third position allowing fluid communication between the first tank and the third tank, and a fourth position allowing fluid communication between the first tank, the second tank, and the third tank.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, it is one aspect of the present invention to provide a valve assembly 20 for use in an air spring assembly 22 for changing the stiffness of the air spring assembly 22.

Figure 1:
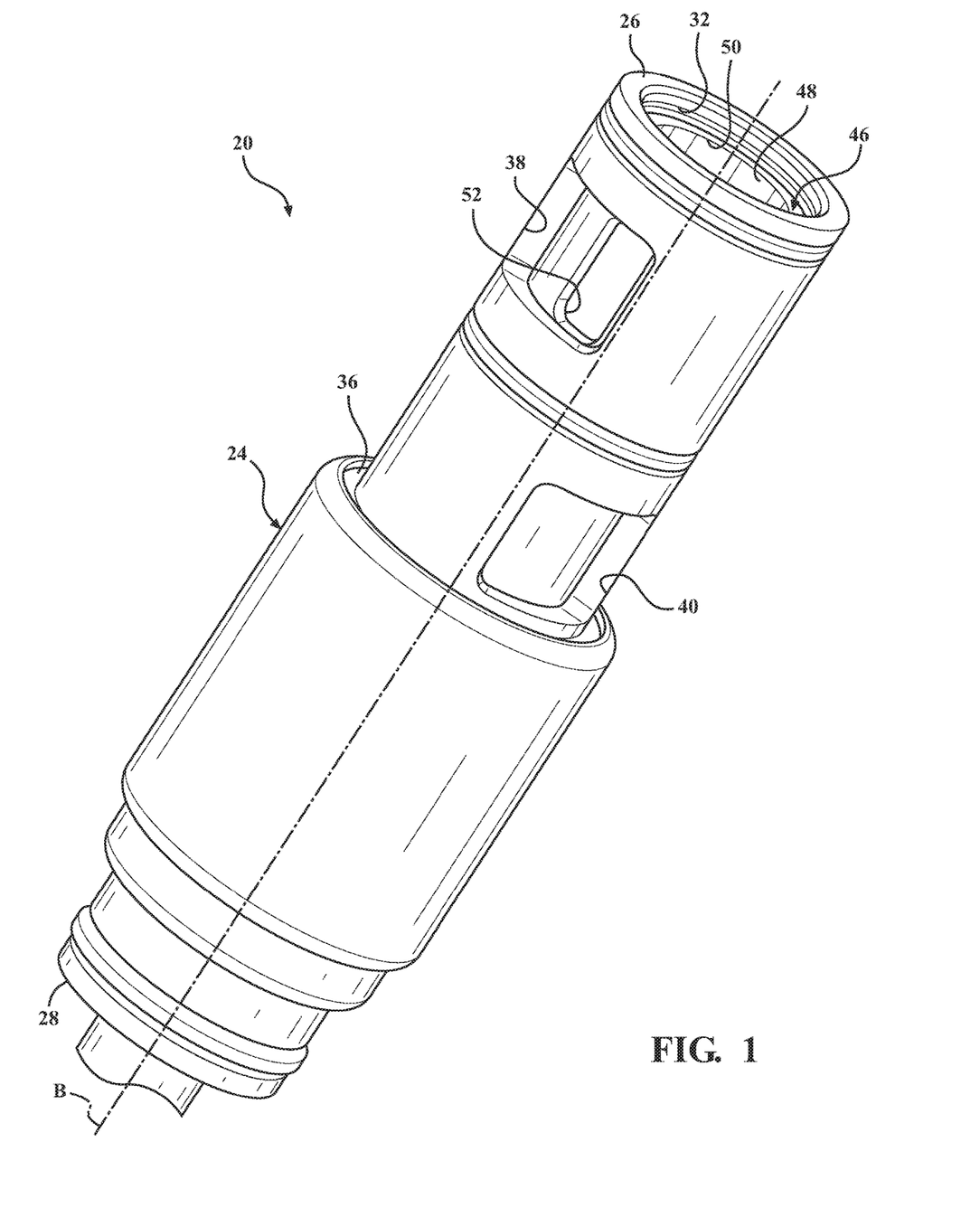
FIG. 1 is a perspective view of the valve assembly.

The valve assembly 20, as generally shown in FIG. 1, includes a body 24, having a generally cylindrical shape, disposed on a body axis B. The body 24 extends between an opened end 26 and a closed end 28 wherein the opened end 26 is disposed in fluid communication with a first tank 30. It should be appreciated that the first tank 30 can be the air spring 22 or an additional air reservoir. The body 24 defines a cavity 32, 34 extending along the body axis B between the opened end 26 and the closed end 28.

A divider 36, having a generally circular shape, is disposed in the cavity 32, 34, extending radially inwardly from the body 24 toward the center axis A, separating the cavity 32, 34 into an upper portion 32 between the opened end 26 and the divider 36 and a lower portion 34 between the closed end 28 and the divider 36. The body 24 defines at least two orifices 38, 40 including at least one upper orifice 38 and at least one lower orifice 40. The at least one upper orifice 38, having a generally rectangular shape, is disposed adjacent to the opened end 26 and in fluid communication with the cavity 32, 34 and a second tank 42. The at least one lower orifice 40, having a generally rectangular shape, is disposed adjacent to the divider 36, axially spaced from the at least one upper orifice 38, and in fluid communication with the cavity 32, 34 and a third tank 44. It should be appreciated that the second tank 42 and the third tank 44 can be additional air reservoirs. It should be appreciated that the orifices 38, 40 can be of any shape, such as, but not limited to, circular shape.

An actuator 46 is disposed in the cavity 32, 34 of the body 24, rotatable along the body axis B, in fluid communication with the first tank 30, the second tank 42, and the third tank 44. The actuator 46 is movable from a first position to a second position, a third position, and a fourth position. When the actuator 46 is in the first position, the actuator 46 is in fluid communication with the first tank 30. When the actuator 46 is in the second position, the actuator 46 allows for fluid communication between the first tank 30 and the second tank 42. When the actuator 46 is in the third position, the actuator 46 allows for fluid communication between the first tank 30 and the third tank 44. When the actuator 46 is in the fourth position, the actuator 46 allows for fluid communication between the first tank 30, the second tank 42, and the third tank 44 thereby providing the air spring 22 with four different stiffness rates depending on the positioning of the actuator 46.

The actuator 46 includes a valve member 48, having a generally tubular shape, disposed in the upper portion 32 and extending about the body axis B. The valve member 48 defines a conduit 50 disposed in fluid communication with the first tank 30 to define the first position. The valve member 48 is able to rotate in the upper portion 32 of the body 24 from the first position to the second position, third position, and the fourth position. In other words, initially, the valve member 48 is in the first position wherein the conduit 50 is in fluid communication with the first tank 30. As the valve member 48 rotates along the body axis B, the valve member 48 is able to open fluid communications between the first tank 30, the second tank 42, and the third tank 44. In the second position, the first tank 30 is in fluid communication with the second tank 42. In the third position, the first tank 30 is in fluid communication with the third tank 44. In the fourth position, the first tank 30 is in fluid communication with the second tank 42 and the third tank 44.

Figure 2:
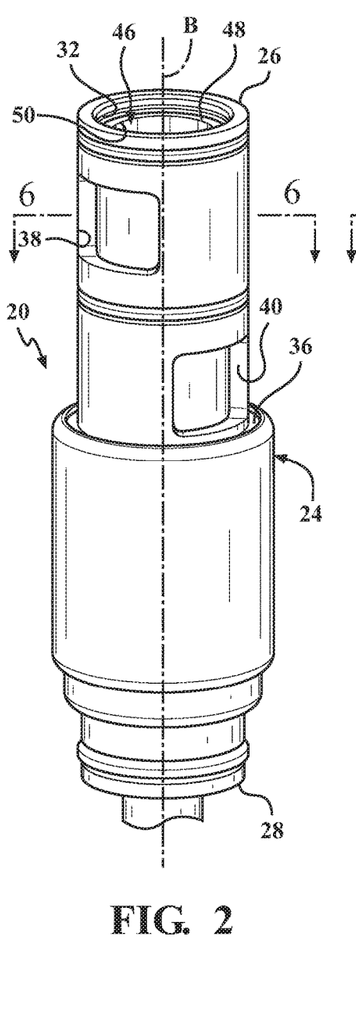
FIG. 2 is a perspective view of the valve assembly in the first position.
Figure 3:
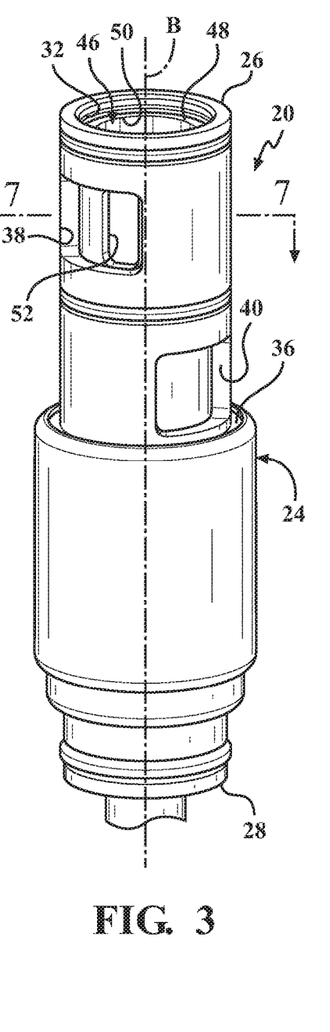
FIG. 3 is a perspective view of the valve assembly in the second position.
Figure 4:
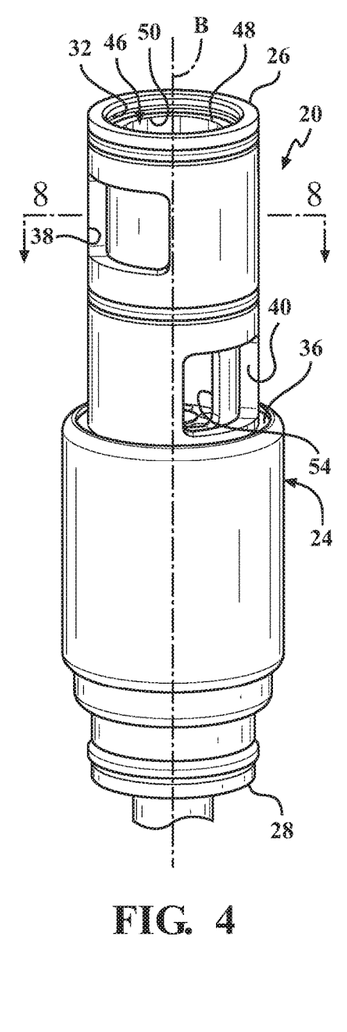
FIG. 4 is a perspective view of the valve assembly in the third position.
Figure 5:
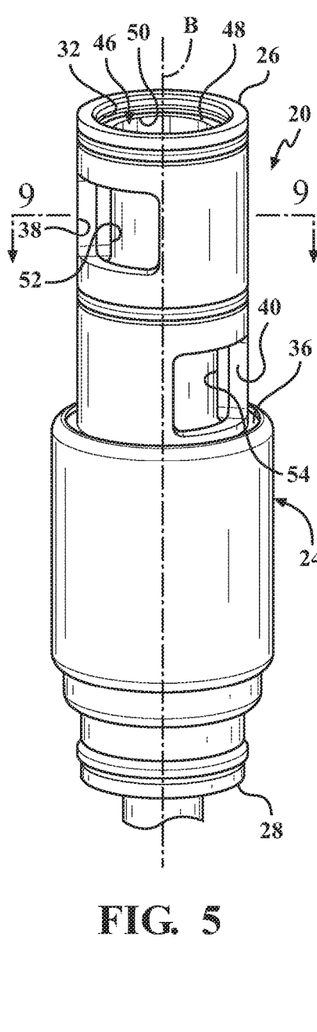
FIG. 5 is a perspective view of the valve assembly in the fourth position.
Figure 6:
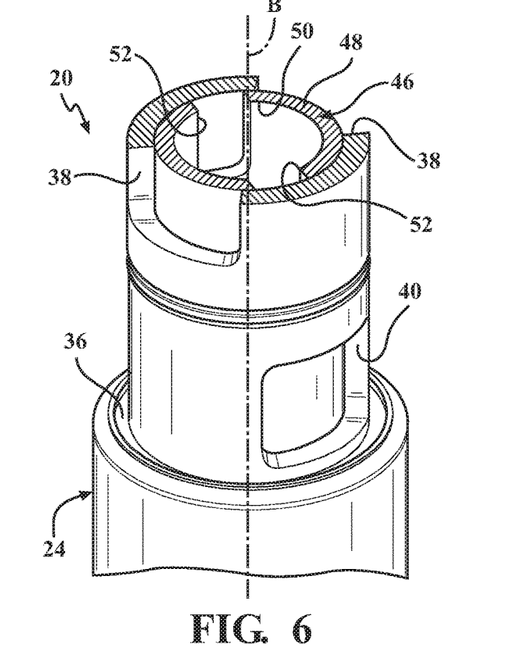
FIG. 6 is an enlarged cross-sectional perspective view of the valve assembly of FIG. 2 along the lines 6-6.
Figure 7:
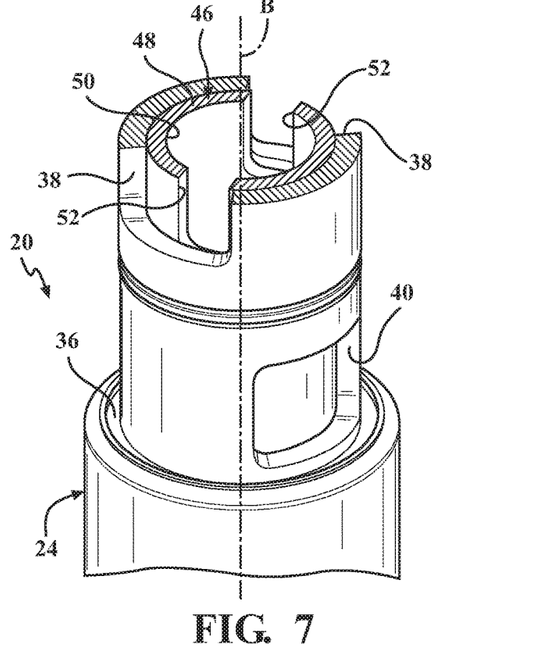
FIG. 7 is an enlarged cross-sectional perspective view of the valve assembly of FIG. 3 along the lines 7-7.
Figure 8:
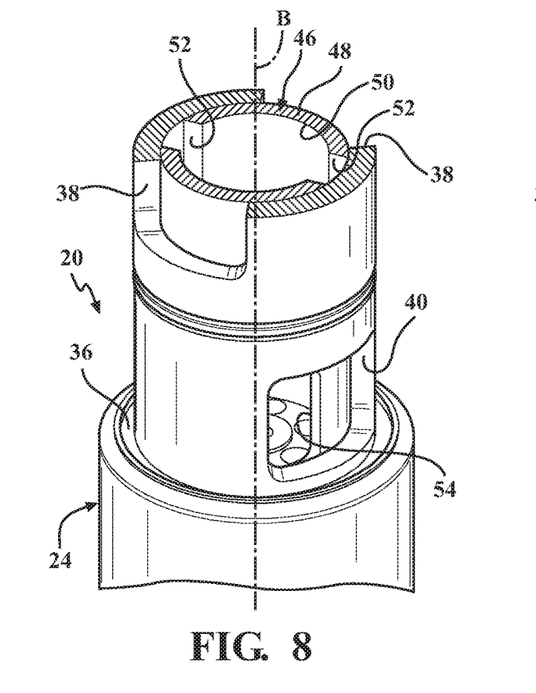
FIG. 8 is an enlarged cross-sectional perspective view of the valve assembly of FIG. 4 along the lines 8-8.
Figure 9:
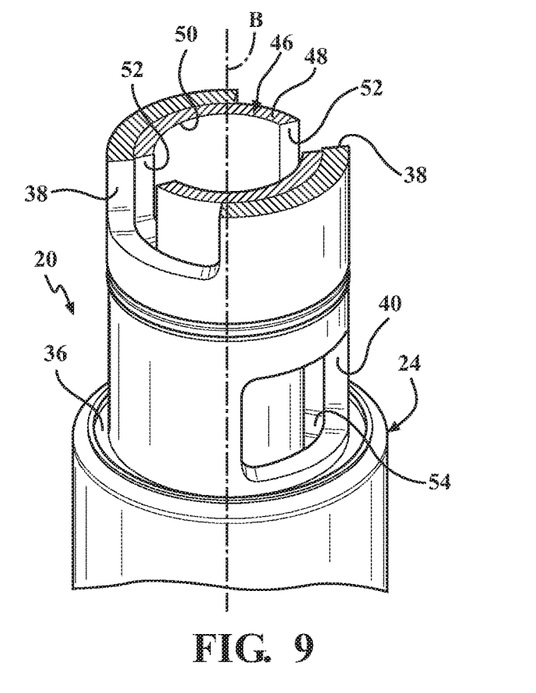
FIG. 9 is an enlarged cross-sectional perspective view of the valve assembly of FIG. 5 along the lines 9-9.

The valve member 48 defines at least two slots 52, 54 including at least one upper slot 52 and at least one lower slot 54. The at least one upper slot 52, having a generally rectangular shape, is disposed spaced from the opened end 26 and in fluid communication with the conduit 50. The at least one lower slot 54, having a generally rectangular shape, axially spaced from the at least one upper slot 52, is disposed in fluid communication with the conduit 50. The valve member 48 is rotatable from the first position to the second position, the third position, and the fourth position. As best shown in FIGS. 2 and 6, in the first position, the conduit 50 is disposed in the first tank 30. As best shown in FIGS. 3 and 7, in the second position, the at least one upper slot 52 is aligned with the at least one upper orifice 38 to allow fluid communication between the first tank 30 and the second tank 42. As best shown in FIGS. 4 and 8, in the third position, the at least one lower slot 54 is aligned with the at least one lower orifice 40 to allow fluid communication between the first tank 30 and the third tank 44. As best shown in FIGS. 5 and 9, in the fourth position, the at least one upper slot 52 is aligned with the at least one upper orifice 38 and the at least one lower slot 54 is aligned with the at least one lower orifice 40 to allow fluid communication between the first tank 30, the second tank 42, and the third tank 44. It should be appreciated that the slots 52, 54 can be of any shape such as, but not limited to, circular shape.

As best shown in FIGS. 6-10, the at least one upper orifice 38 includes a pair of upper orifices 38, disposed diametrically opposite of one another, in fluid communication with the second tank 42. The at least one lower orifice 40 includes a pair of lower orifices 40, disposed diametrically opposite of one another, and orthogonal to the pair of upper orifices 38, in fluid communication with the third tank 44. The at least one upper slot 52 includes a pair of upper slots 52, disposed diametrically opposite of one another, for alignment with the pair of upper orifices 38 in the second position and the fourth position. The at least one lower slot 54 includes a pair of lower slots 54 disposed diametrically opposite of one another, axially spaced from and orthogonal to the pair of upper slots 52, for alignment with the pair of lower orifices 40 in the third position and the fourth position. The diametrically opposite direction is to equalize side forces caused by the air flow that could apply to the motor shaft.

Figure 10:
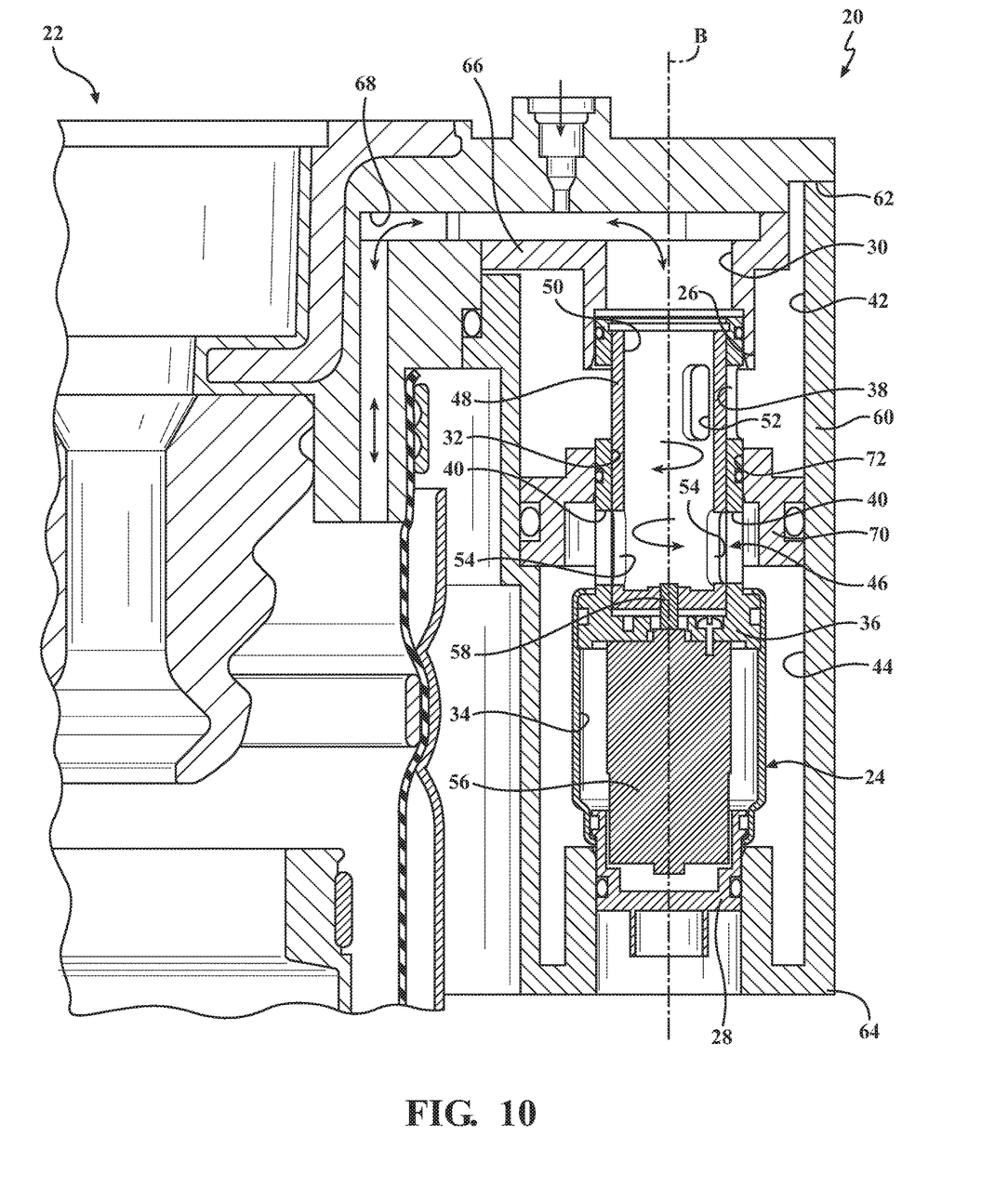
FIG. 10 is an alternative embodiment of the valve assembly in accordance with the present invention.

The actuator 46 includes a moving member 56 disposed in the lower portion 34 and coupled to the valve member 48 for rotating the valve member 48 along the body axis B from the first position to the second position, the third position, and the fourth position. It should be appreciated the actuator 46 can be any apparatus that rotates the moving member 56 such as but not limited to an electric motor. As shown in FIG. 10, a connector 58 extends outwardly from the moving member 56, through the divider 36, and is coupled to the valve member 48 to allow the moving member 56 to rotate the valve member 48 from the first position to the second position and the third position and the fourth position. By rotating the valve member 48, the actuator 46 is able to reduce the noise generated by moving the valve member 56, 48 via other motions, e.g. rectilinearly along the body axis B.

It is another aspect of the present invention to provide a valve assembly 20 for use in an air spring 22. The valve assembly 20, as generally shown in FIG. 10, includes a casing 60, having a generally cylindrical shape, disposed on a body axis B extending between a proximal end 62 and a distal end 64. The casing 60 defines a compartment extending between the proximal end 62 and the distal end 64. A cap 66, having a generally circular shape, is disposed at the proximal end 62 of the casing 60. The cap 66 defines a first tank 30, having a generally circular shape, disposed in fluid communication with the compartment. The cap 66 defines a channel 68 and is disposed therein for connecting the first tank 30 to the air spring 22 to establish fluid communication between the air spring 22 and the compartment. A partitioning member 70 is slidably disposed in the compartment and separates the compartment into a second tank 42 and a third tank 44. The second tank 42 is extends between the proximal end 62 and the partitioning member 70. The third tank 44 extends between the partitioning member 70 and the distal end 64. The partitioning member 70 defines a hole 72, having a generally circular shape, extending along the body axis B for allowing fluid communication between the second tank 42 and the third tank 44.

A valve 20 includes a body 24, having a generally cylindrical shape, disposed in the hole 72 and extending on the body axis B between an opened end 26 and a closed end 28. The opened end 26 of the body 24 is attached to the cap 66 and disposed in fluid communication with the first tank 30. The closed end 28 of the body 24 is attached to the distal end 64 of the casing 60. The body 24 defines a cavity 32, 34 extending between the opened end 26 and the closed end 28. The body 24 further includes a divider 36, having a generally circular shape, disposed in the cavity 32, 34 and extends radially inwardly from the body 24 toward the center axis A to separate the cavity 32, 34 into an upper portion 32 and a lower portion 34. The upper portion 32 extends between the opened end 26 and the divider 36. The lower portion 34 extends between the closed end 28 and the divider 36.

The body 24 defining at least two orifices 38, 40 including at least one upper orifice 38 and at least one lower orifice 40. The at least one upper orifice 38, having a generally rectangular shape, is disposed adjacent to the opened end 26 and in fluid communication with the cavity 32, 34 and the second tank 42. The at least one lower orifice 40, having a generally rectangular shape, is disposed adjacent to the divider 36, axially spaced from the upper orifice, and in fluid communication with the cavity 32, 34 and the third tank 44. It should be appreciated that the orifices 38, 40 can be of any shape such as, but not limited to, circular shape.

An actuator 46 is disposed in the cavity 32, 34 of the body 24, rotatable along the body axis B, in fluid communication with the first tank 30, the second tank 42, and the third tank 44. The actuator 46 is movable from a first position to a second position, a third position, and a fourth position. When the actuator 46 is in the first position, the actuator 46 is in fluid communication with the first tank 30. When the actuator 46 is in the second position, the actuator 46 allows for fluid communication between the first tank 30 and the second tank 42. When the actuator 46 is in the third position, the actuator 46 allows for fluid communication between the first tank 30 and the third tank 44. When the actuator 46 is in the fourth position, the actuator 46 allows for fluid communication between the first tank 30, the second tank 42, and the third tank 44 thereby providing the air spring 22 with four different stiffness rates depending on the positioning of the actuator 46.

The actuator 46 includes a valve member 48, having a generally tubular shape, disposed in the upper portion 32 and extending about the body axis B. The valve member 48 defines a conduit 50 disposed in fluid communication with the first tank 30 to define the first position. The valve member 48 is able to rotate in the upper portion 32 of the body 24 from the first position to the second position, the third position, and the fourth position. In other words, initially, the valve member 48 is in the first position wherein the conduit 50 is in fluid communication with the first tank 30. As the valve member 48 rotates along the body axis B, the valve member 48 is able to open the communications between the first tank 30, the second tank 42, and the third tank 44. In the second position, the first tank 30 is in fluid communication with the second tank 42. In the third position, the first tank 30 is in fluid communication with the third tank 44. In the fourth position, the first tank 30 is in fluid communication with the second tank 42 and the third tank 44.

The valve member 48 defines at least two slots 52, 54 including at least one upper slot 52 and at least one lower slot 54. The at least one upper slot 52, having a generally rectangular shape, is disposed spaced from the opened end 26 and in fluid communication with the conduit 50. The at least one lower slot 54, having a generally rectangular shape, axially spaced from the at least one upper slot 52, is disposed in fluid communication with the conduit 50. The valve member 48 is rotatable from the first position to the second position, the third position, and the fourth position. While in the first position, the conduit 50 of the valve member 48 is disposed in fluid communication with the first tank 30. In the second position, the at least one upper slot 52 is aligned with the at least one upper orifice 38 to allow fluid communication between the first tank 30 and the second tank 42. In the third position, the at least one lower slot 54 is aligned with the at least one lower orifice 40 to allow fluid communication between the first tank 30 and the third tank 44. In the fourth position, the at least one upper slot 52 is aligned with the at least one upper orifice 38 and the at least one lower slot 54 is aligned with the at least one lower orifice 40 to allow the communication between the first tank 30, the second tank 42, and the third tank 44. It should be appreciated that the slots 52, 54 can be of any shape such as, but not limited to, circular shape.

The at least one upper orifice 38 includes a pair of upper orifices 38, disposed diametrically opposite of one another, in fluid communication with the second tank 42. The at least one lower orifice 40 includes a pair of lower orifices 40, disposed diametrically opposite of one another, and orthogonal to the pair of upper orifices 38, in fluid communication with the third tank 44. The at least one upper slot 52 includes a pair of upper slots 52, disposed diametrically opposite of one another, for alignment with the pair of upper orifices 38 in the second position and the fourth position. The at least one lower slot 54 includes a pair of lower slots 54 disposed diametrically opposite of one another, axially spaced from and orthogonal to the pair of upper slots 52, for alignment with the pair of lower orifices 40 in the third position and the fourth position. The diametrically opposite direction is to equalize side forces caused by the air flow that could apply to the motor shaft.

The actuator 46 includes a moving member 56 disposed in the lower portion 34 and coupled to the valve member 48 for rotating the valve member 48 along the body axis B from the first position to the second position, the third position, and the fourth position. It should be appreciated the actuator 46 can be any apparatus that rotates the moving member 56 such as but not limited to an electric motor. A connector 58 extends outwardly from the moving member 56, through the divider 36, and rotatably attached to the valve member 48 to allow the moving member 56 to rotate the valve member 48 from the first position to the second position, the third position, and the fourth position.

It is another aspect of the present invention to provide an air spring assembly 22. The air spring assembly 22, as generally show in FIG. 11, includes a housing 74, having a generally cylindrical shape, disposed on a center axis A and extending along the center axis A between a first end 76 and a second end 78. The housing 74 defines a chamber 80 extending along the center axis A between the first end 76 and the second end 78. A top 82, having a generally cylindrical shape, dispose at the first end 76 of the housing 74 and in sealing engagement with the first end 76 to close the chamber 80.

Figure 11:
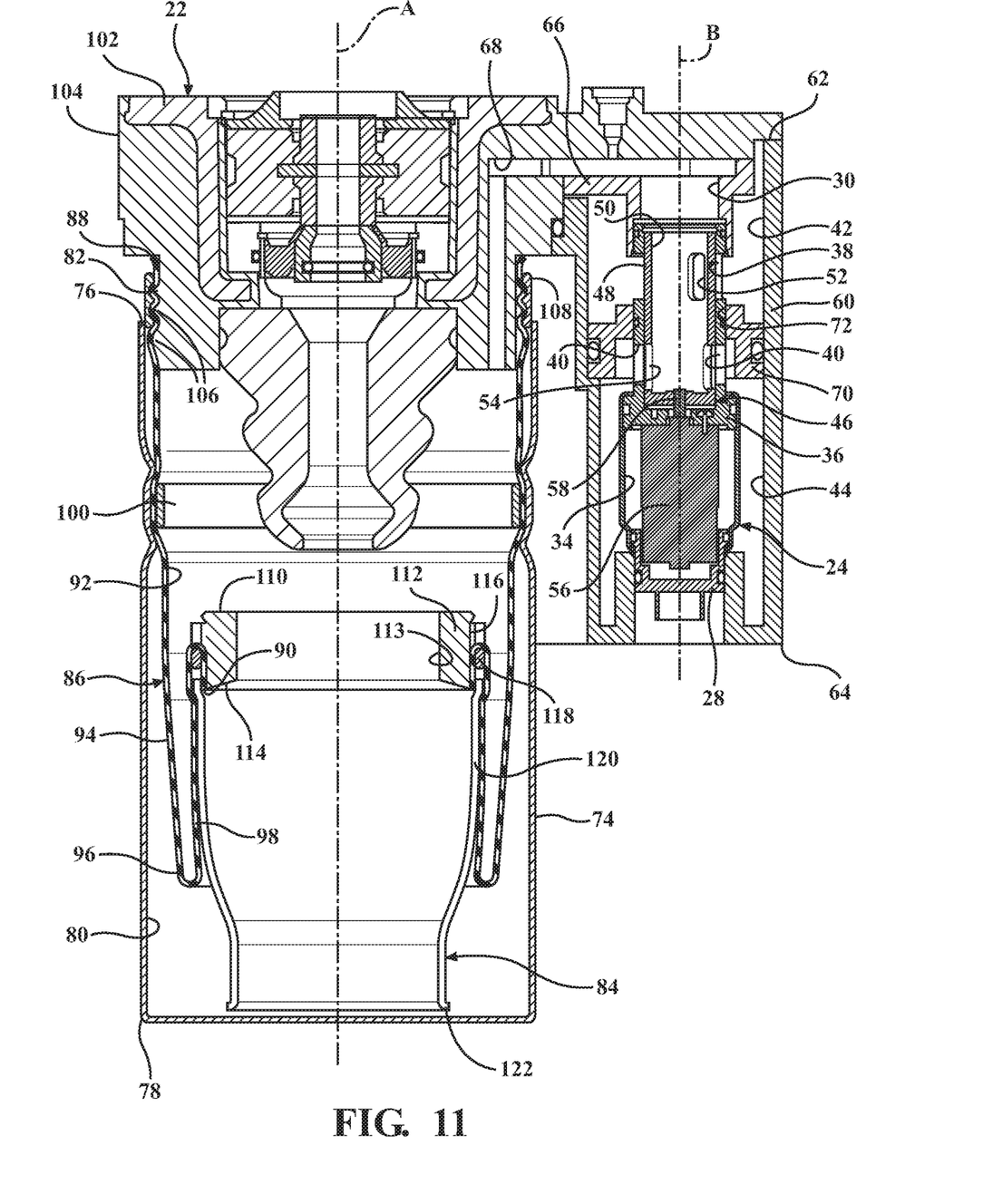
FIG. 11 is cross-sectional perspective view of the air spring including the valve assembly.

A piston 84, having a tubular shape, is disposed in the chamber 80 on the center axis A and adjacent to the second end 78 of the housing 74. A bellows 86, made from an elastomeric material and having a generally tubular shape, is disposed in the compartment on the center axis A. The bellows 86 extends annularly about the center axis A between a primary end 88 and a secondary end 90. The primary end 88 is secured to the top 82. The secondary end 90 is secured to the piston 84 thereby defining a pocket 92 extending between the top 82 and the piston 84 and the second end 78 of the housing 74. The bellows 86 includes an outer sleeve 94, having a tubular shape, extending from the primary end 88 of the bellows 86 to an intermediate end 96 parallel to the center axis A. The bellows 86 includes an inner sleeve 98 extending from the intermediate end 96 of the bellows 86, in an arcuate shape toward the center axis A and the first end 76 of the bellows 86, parallel to the outer sleeve 94 to the secondary end 90 to engage the piston 84. A crimp ring 100, having a generally circular shape, is disposed in the chamber 80 and adjacent to the first end 76 of the housing 74. The crimp ring 100 abuts the bellows 86 to sandwich the bellows 86 between the crimp ring 100 and the housing 74 to secure the bellows 86 to the housing 74 in the chamber 80.

The top 82 includes a plate 102, having a generally circular shape, and a side wall 104, having a generally cylindrical shape. The side wall 104 extends perpendicularly outwardly from and annularly about the plate 102 to engage first end 76 of the housing 74. The side wall 104 defines a plurality of protrusions 106 spaced from one another, extending radially outwardly from the side wall 104, annularly about the center axis A to engage the first end 76 of the bellows 86. A first ring 108, having a generally circular shape, is disposed at the primary end 88 of the bellows 86 and extending annularly about the side wall 104 of the top 82 to sandwich the bellows 86 between the side wall 104 of the top 82 and the first ring 108 and secure the side wall 104 to the top 82.

The piston 84 includes an upper part 110, having a generally circular shape, defining an interior surface 112 and an exterior surface 114 with the interior surface 112 facing the top 82 and the exterior surface 114, space from the interior surface 112, facing the secondary end 90. A periphery 116 extends between the interior surface 112 and the exterior surface 114 and annularly about the center axis A to connect the interior surface 112 with the exterior surface 114. The upper part 110 defines a bore 113, having a generally cylindrical shape, disposed on the center axis A, extending between the interior surface 112 and the exterior surface 114, in fluid communication with the chamber 80. A second ring 118, having a generally circular shape, is disposed on the bellows 86 at the secondary end 90 of the bellows 86 and extending annularly about the upper part 110 of the piston 84, sandwiching the bellows 86 between the upper part 110 of the piston 84 and the second ring 118, to secure the bellows 86 to the upper part 110 of the piston 84. The piston 84 further includes a bottom part 120, having a generally tubular shape, extending outwardly from the upper part 110 and annularly about the center axis A to a terminal end 122 adjacent to the second end 78 of the housing 74. The terminal end 122 is spaced from the second end 78 to allow fluid communication between the chamber 80 and the pocket 92.

A casing 60, having a generally cylindrical shape, disposed on a body axis B extending between a proximal end 62 and a distal end 64. The casing 60 defines a compartment extending between the proximal end 62 and the distal end 64. A cap 66, having a generally circular shape, is disposed at the proximal end 62 of the casing 60. The cap 66 defines a first tank 30, having a generally circular shape, disposed in fluid communication with the compartment. The cap 66 defines a channel 68 and is disposed therein for connecting the first tank 30 to the air spring 22 to establish fluid communication between the air spring 22 and the compartment. A partitioning member 70 is slidably disposed in the compartment and separates the compartment into a second tank 42 and a third tank 44. The second tank 42 is extends between the proximal end 62 and the partitioning member 70. The third tank 44 extends between the partitioning member 70 and the distal end 64. The partitioning member 70 defines a hole 72, having a generally circular shape, extending along the body axis B for allowing fluid communication between the second tank 42 and the third tank 44.

A valve 20 includes a body 24, having a generally cylindrical shape, disposed in the hole 72 and extending on the body axis B between an opened end 26 and a closed end 28. The opened end 26 of the body 24 is attached to the cap 66 and disposed in fluid communication with the first tank 30. The closed end 28 of the body 24 is attached to the distal end 64 of the casing 60. The body 24 defines a cavity 32, 34 extending between the opened end 26 and the closed end 28. The body 24 further includes a divider 36, having a generally circular shape, disposed in the cavity 32, 34 and extends radially inwardly from the body 24 toward the center axis A to separate the cavity 32, 34 into an upper portion 32 and a lower portion 34. The upper portion 32 extends between the opened end 26 and the divider 36. The lower portion 34 extends between the closed end 28 and the divider 36.

The body 24 defining at least two orifices 38, 40 including at least one upper orifice 38 and at least one lower orifice 40. The at least one upper orifice 38, having a generally rectangular shape, is disposed adjacent to the opened end 26 and in fluid communication with the cavity 32, 34 and the second tank 42. The at least one lower orifice 40, having a generally rectangular shape, is disposed adjacent to the divider 36, axially spaced from the at least one upper orifice 38, and in fluid communication with the cavity 32, 34 and the third tank 44. It should be appreciated that the orifices 38, 40 can be of any shape such as, but not limited to, circular shape.

An actuator 46 is disposed in the cavity 32, 34 of the body 24, rotatable along the body axis B, in fluid communication with the first tank 30, the second tank 42, and the third tank 44. The actuator 46 is movable from a first position to a second position, a third position, and a fourth position. When the actuator 46 is in the first position, the actuator 46 is in fluid communication with the first tank 30. When the actuator 46 is in the second position, the actuator 46 allows for fluid communication between the first tank 30 and the second tank 42. When the actuator 46 is in the third position, the actuator 46 allows for fluid communication between the first tank 30 and the third tank 44. When the actuator 46 is in the fourth position, the actuator 46 allows for fluid communication between the first tank 30, the second tank 42, and the third tank 44 thereby providing the air spring 22 with four different stiffness rates depending on the positioning of the actuator 46.

The actuator 46 includes a valve member 48, having a generally tubular shape, disposed in the upper portion 32 and extending about the body axis B. The valve member 48 defines a conduit 50 disposed in fluid communication with the first tank 30 to define the first position. The valve member 48 is able to rotate in the upper portion 32 of the body 24 from the first position to the second position, the third position, and the fourth position. In other words, initially, the valve member 48 is in the first position wherein the conduit 50 is in fluid communication with the first tank 30. As the valve member 48 rotates along the body axis B, the valve member 48 is able to open the communications between the first tank 30, the second tank 42, and the third tank 44. In the second position, the first tank 30 is in fluid communication with the second tank 42. In the third position, the first tank 30 is in fluid communication with the third tank 44. In the fourth position, the first tank 30 is in fluid communication with the second tank 42 and the third tank 44.

The valve member 48 defines at least two slots 52, 54 including at least one upper slot 52 and at least one lower slot 54. The at least one upper slot 52, having a generally rectangular shape, is disposed spaced from the opened end 26 and in fluid communication with the conduit 50. The at least one lower slot 54, having a generally rectangular shape, axially spaced from the at least one upper slot 52, is disposed in fluid communication with the conduit 50. The valve member 48 is rotatable from the first position to the second position, the third position, and the fourth position. While in the first position, the conduit 50 of the valve member 48 is disposed in fluid communication with the first tank 30. In the second position, the at least one upper slot 52 is aligned with the at least one upper orifice 38 to allow fluid communication between the first tank 30 and the second tank 42. In the third position, the at least one lower slot 54 is aligned with the at least one lower orifice 40 to allow fluid communication between the first tank 30 and the third tank 44. In the fourth position, the at least one upper slot 52 is aligned with the at least one upper orifice 38 and the at least one lower slot 54 is aligned with the at least one lower orifice 40 to allow the communication between the first tank 30, the second tank 42, and the third tank 44. It should be appreciated that the slots 52, 54 can be of any shape such as, but not limited to, circular shape.

As best shown in FIG. 11, the at least one upper orifice 38 includes a pair of upper orifices 38, disposed diametrically opposite of one another, in fluid communication with the second tank 42. The at least one lower orifice 40 includes a pair of lower orifices 40, disposed diametrically opposite of one another, and orthogonal to the pair of upper orifices 38, in fluid communication with the third tank 44. The at least one upper slot 52 includes a pair of upper slots 52, disposed diametrically opposite of one another, for alignment with the pair of upper orifices 38 in the second position and the fourth position. The at least one lower slot 54 includes a pair of lower slots 54 disposed diametrically opposite of one another, axially spaced from and orthogonal to the pair of upper slots 52, for alignment with the pair of lower orifices 40 in the third position and the fourth position. The diametrically opposite direction is to equalize side forces caused by the air flow that could apply to the motor shaft.

The actuator 46 includes a moving member 56 disposed in the lower portion 34 and coupled to the valve member 48 for rotating the valve member 48 along the body axis B from the first position to the second position, the third position, and the fourth position. It should be appreciated the actuator 46 can be any apparatus that rotates the moving member 56 such as but not limited to a motor. A connector 58 extends outwardly from the moving member 56, through the divider 36, and rotatably attached to the valve member 48 to allow the moving member 56 to rotate the valve member 48 from the first position to the second position, the third position, and the fourth position.

In operation, initially, the actuator 46 of the valve 20 is disposed in the first position, e.g. the conduit 50 is in fluid communication with the first tank 30. The first tank 30 can be disposed in fluid communication with the chamber 80 of the air spring 22 via the channel 68. As a vehicle moving along a road, the actuator 46 being in the first position defines a first stiffness rate for the air spring 22. To change the stiffness rates of the air spring 22, e.g. changing the air volume distribution on the air spring 22, an electrical signal is send to the moving member 56, e.g. the motor, to rotate the valve member 48 from the first position to the second position, the third position, and the fourth position. In the second position, the at least one upper slot 52 of the valve member 48 is aligned with the at least one upper orifice 38 of the body 24 to allow fluid communication between the first tank 30 and the second tank 42 thereby defining a second stiffness rate. In the third position, the at least one lower slot 54 of the valve member 48 is aligned with the at least one lower orifice 40 of the body 24 to allow fluid communication between the first tank 30 and the third tank 44 to define a third stiffness rate. In the fourth position, the at least one upper slot 52 of the valve member 48 is aligned with the at least one upper orifice 38 of the body 24 and the at least one lower slot 54 is aligned with the at least one lower orifice 40 to allow the communication between the first tank 30, the second tank 42, and the third tank 44 to define a fourth stiffness rate. The rotation movement of the valve member 48 is easily switchable between the different stiffness rates. In addition, the rotational movement also provides a smooth transition between the stiffness rates, e.g. from the first position to the second position, the third position, or the fourth position, thereby reducing the amount of noises generated by a rectilinear movement of the valve member 48. It should be appreciated that with more tanks 30, 42, 44 being connected, there are move volumes for the air inside the air spring 22 which lowers the stiffness of the air spring 22. On the contrary, if there are less tanks 30, 42, 44 being connected, e.g. only the first tank 30, there are less volumes for the air inside the air spring 22 which increases the stiffness of the air spring 22.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A valve assembly for an air spring comprising:
   a body disposed on a body axis extending between an opened end disposed in fluid communication with a first tank and a closed end and defining a cavity extending therebetween;
   a divider disposed in said cavity separating said cavity into an upper portion between said opened end and said divider and a lower portion between said closed end and said divider;
   said body defining at least two orifices including at least one upper orifice in fluid communication with said cavity and a second tank and at least one lower orifice axially spaced from said at least one upper orifice in fluid communication with said cavity and a third tank; and
   an actuator disposed in said cavity of said body and rotatable along said body axis in fluid communication with the first tank and the second tank and the third tank and movable from a first position with said actuator being in fluid communication with the first tank alone to a second position allowing fluid communication between the first tank and the second tank and a third position allowing fluid communication between the first tank and the third tank and a fourth position allowing fluid communication between the first tank and the second tank and the third tank;
   wherein said actuator includes a valve member disposed in said upper portion and defining a conduit disposed in fluid communication with the first tank to define said first position and being rotatable from said first position to said second position and said third position and said fourth position;
   wherein said valve member defines at least two slots including at least one upper slot spaced from said opened end and in fluid communication with said conduit and at least one lower slot axially spaced from said at least one upper slot and in fluid communication with said conduit whereby said valve member is rotatable from said first position to said second position with said at least one upper slot being aligned with said at least one upper orifice to allow fluid communication between the first tank and the second tank, to said third position with said at least one lower slot being aligned with said at least one lower orifice to allow fluid communication between the first tank and the third tank, and to said fourth position with said at least one upper slot being aligned with said at least one upper orifice and said at least one lower slot being aligned with said at least one lower orifice to allow fluid communication between the first tank and the second tank and the third tank; and
   wherein said at least one upper orifice includes a pair of upper orifices disposed diametrically opposite of one another in fluid communication with the second tank; and
   said at least one lower orifice includes a pair of lower orifices disposed diametrically opposite of one another axially space from and orthogonal to said pair of upper orifices and in fluid communication with the third tank.

2. The valve assembly as set forth in claim 1 wherein said at least one upper slot includes a pair of upper slots disposed diametrically opposite of one another for alignment with said pair of upper orifices in said second position and said fourth position; and
   said at least one lower slot includes a pair of lower slots disposed diametrically opposite of one another axially space from and orthogonal to said pair of upper slots for alignment with said lower orifices in said third position and said fourth position.

3. The valve assembly as set forth in claim 1 wherein said actuator includes a moving member disposed in said lower portion and coupled to said valve member for rotating said valve member along said body axis from said first position to said second position and said third position and said fourth position.

4. The valve assembly as set forth in claim 1 wherein said moving member is a motor.

5. The valve assembly as set forth in claim 1 further including a connector extending outwardly from said moving member through said divider and coupled to said valve member to allow said moving member to rotate said valve member from said first position to said second position and said third position and said fourth position.

6. A valve assembly for an air spring comprising;
a casing disposed on a body axis extending between a proximal end and a distal end defining a compartment extending therebetween;
a cap disposed at said proximal end and defining a first tank disposed in fluid communication with said compartment;
a partitioning member slidably disposed in said compartment separating said compartment into a second tank and a third tank with said second tank being between said proximal end and said partitioning member and said third tank being between said partitioning member and said distal end;
a valve including a body disposed in said compartment and extending through said partitioning member along said body axis between an opened end attached to said cap in fluid communication with said first tank and a closed end attached to said distal end and defining a cavity extending between said opened end and said closed end;
a divider disposed in said cavity separating said cavity into an upper portion between said opened end and said divider and a lower portion between said closed end and said divider;
said body defining at least two orifices including at least one upper orifice in fluid communication with said cavity and said second tank and at least one lower orifice axially spaced from said at least one upper orifice and in fluid communication with said cavity and said third tank; and
an actuator disposed in said cavity of said body and rotatable along said body axis in fluid communication with said first tank and said second tank and said third tank and movable from a first position with said actuator being in fluid communication with said first tank alone to a second position allowing fluid communication between said first tank and said second tank and a third position allowing fluid communication between said first tank and said third tank and a fourth position allowing fluid communication between said first tank and said second tank and said third tank.

7. The valve assembly as set forth in claim 6 wherein said actuator includes a valve member disposed in said upper portion and defining a conduit disposed in fluid communication with said first tank to define said first position and being rotatable from said first position to said second position and said third position and said fourth position.

8. The valve assembly as set forth in claim 7 wherein said valve member defines at least two slots including at least one upper slot spaced from said opened end and in fluid communication with said conduit and at least one lower slot axially spaced from said at least one upper slot and in fluid communication with said conduit whereby said valve member is rotatable from said first position to said second position with said at least one upper slot being aligned with said at least one upper orifice to allow fluid communication between said first tank and said second tank, to said third position with said at least one lower slot being aligned with said at least one lower orifice to allow fluid communication between said first tank and said third tank, and to said fourth position with said at least one upper slot being aligned with said at least one upper orifice and said at least one lower slot being aligned with said at least one lower orifice to allow fluid communication between said first tank and said second tank and said third tank.

9. The valve assembly as set forth in claim 8 wherein said at least one upper orifice includes a pair of upper orifices disposed diametrically opposite of one another in fluid communication with said second tank; and
said at least one lower orifice includes a pair of lower orifices disposed diametrically opposite of one another axially space from and orthogonal to said pair of upper orifices and in fluid communication with said third tank.

10. The valve assembly as set forth in claim 9 wherein said at least one upper slot includes a pair of upper slots disposed diametrically opposite of one another for alignment with said pair of upper orifices in said second position and said fourth position; and
said at least one lower slot includes a pair of lower slots disposed diametrically opposite of one another and orthogonal to said pair of upper slots for alignment with said pair of lower orifices in said third position and said fourth position.

11. The valve assembly as set forth in claim 7 wherein said actuator includes a moving member disposed in said lower portion and coupled to said valve member for rotating said valve member along said body axis from said first position to said second position and said third position and said fourth position.

12. The valve assembly as set forth in claim 11 further including a connector extending outwardly from said moving member through said divider and coupled to said valve member to allow said moving member to rotate said valve member from said first position to said second position and said third position and said fourth position.

13. An air spring assembly comprising:
a housing defining a chamber disposed on a center axis;
a piston disposed in said chamber;
a bellows disposed in said chamber and extending between a primary end secured to said housing and a secondary end secured to said piston defining a pocket extending between said housing and said piston;
a casing disposed on a body axis spaced from said center axis extending between a proximal end and a distal end defining a compartment extending therebetween;
a cap disposed at said proximal end and defining a first tank disposed in fluid communication with said compartment;
a partitioning member slidably disposed in said compartment separating said compartment into a second tank and a third tank with said second tank being between said proximal end and said partitioning member and said third tank being between said partitioning member and said distal end;
a valve including a body disposed in said compartment and extending through said partitioning member along said body axis between an opened end attached to said cap in fluid communication with said first tank and a closed end attached to said distal end and defining a cavity extending between said opened end and said closed end;
a divider disposed in said cavity separating said cavity into an upper portion between said opened end and said divider and a lower portion between said closed end and said divider;

said body defining at least two orifices including at least one upper orifice in fluid communication with said cavity and said second tank and at least one lower orifice axially spaced from said at least one upper orifice and in fluid communication with said cavity and said third tank; and an actuator disposed in said cavity of said body and rotatable along said body axis in fluid communication with said first tank and said second tank and said third tank and movable from a first position with said actuator being in fluid communication with said first tank alone to a second position allowing fluid communication between said first tank and said second tank and a third position allowing fluid communication between said first tank and said third tank and a fourth position allowing fluid communication between said first tank and said second tank and said third tank.

14. The air spring assembly as set forth in claim 13 wherein said actuator includes a valve member disposed in said upper portion and defining a conduit disposed in fluid communication with said first tank to define said first position and being rotatable from said first position to said second position and said third position and said fourth position.

15. The air spring assembly as set forth in claim 14 wherein said valve member defines at least two slots including at least one upper slot spaced from said opened end and in fluid communication with said conduit and at least one lower slot axially spaced from said at least one upper slot and in fluid communication with said conduit whereby said valve member is rotatable from said first position to said second position with said at least one upper slot being aligned with said at least one upper orifice to allow fluid communication between said first tank and said second tank, to said third position with said at least one lower slot being aligned with said at least one lower orifice to allow fluid communication between said first tank and said third tank, and to said fourth position with said at least one upper slot being aligned with said at least one upper orifice and said at least one lower slot being aligned with said at least one lower orifice to allow fluid communication between said first tank and said second tank and said third tank.

16. The air spring assembly as set forth in claim 15 wherein said actuator includes a moving member disposed in said lower portion and coupled to said valve member for rotating said valve member along said body axis from said first position to said second position and said third position and said fourth position.

17. The air spring assembly as set forth in claim 16 further including a connector extending outwardly from said moving member through said divider and coupled to said valve member to allow said moving member to rotate said valve member from said first position to said second position and said third position and said fourth position.

\* \* \* \* \*